(12) United States Patent
Fossati

(10) Patent No.: US 9,125,517 B2
(45) Date of Patent: Sep. 8, 2015

(54) MULTI-PURPOSE COOKING APPLIANCE

(75) Inventor: Laura Fossati, Travedona Monate (IT)

(73) Assignee: Whirlpool Corporation, Benton Harbor, MI (US)

( * ) Notice: Subject to any disclaimer, the term of this patent is extended or adjusted under 35 U.S.C. 154(b) by 1527 days.

(21) Appl. No.: 12/481,618

(22) Filed: Jun. 10, 2009

(65) Prior Publication Data
US 2010/0147159 A1    Jun. 17, 2010

(30) Foreign Application Priority Data
Jun. 10, 2008  (EP) ..................... 08157973

(51) Int. Cl.
| A47J 37/07 | (2006.01) |
| A21B 3/13 | (2006.01) |
| A47J 37/10 | (2006.01) |
| A47J 37/06 | (2006.01) |
| A47J 37/12 | (2006.01) |

(52) U.S. Cl.
CPC ............ *A47J 37/103* (2013.01); *A47J 37/0676* (2013.01); *A47J 37/128* (2013.01)

(58) Field of Classification Search
USPC ........ 99/324, 339, 376, 440, 446; 126/29, 34, 126/35, 40, 39 A–39 M; 219/340, 392, 393, 219/450.1
See application file for complete search history.

(56) References Cited

U.S. PATENT DOCUMENTS

| 1,437,739 | A | * | 12/1922 | Vernon | 126/29 |
| 1,559,760 | A | * | 11/1925 | Murphy | 99/339 |
| 2,101,967 | A | * | 12/1937 | Walterspiel | 99/444 |
| 2,156,216 | A | | 4/1939 | Russell et al. | |
| 2,422,950 | A | | 6/1947 | Cash | |
| 2,675,458 | A | * | 4/1954 | Stiles | 219/448.11 |
| 3,281,577 | A | | 10/1966 | Altemiller | |
| 3,493,726 | A | | 2/1970 | Bardeau | |
| 3,791,368 | A | * | 2/1974 | Hunt | 126/25 A |
| 3,947,241 | A | * | 3/1976 | Caridis et al. | 432/121 |
| 3,947,657 | A | * | 3/1976 | Ershler | 219/450.1 |
| 4,150,609 | A | * | 4/1979 | McClean | 99/372 |
| 4,210,072 | A | | 7/1980 | Pedrini | |
| 4,987,827 | A | | 1/1991 | Marquez | |
| 5,000,085 | A | * | 3/1991 | Archer | 99/445 |
| 5,465,651 | A | * | 11/1995 | Erickson et al. | 99/330 |
| 5,484,621 | A | * | 1/1996 | Erickson et al. | 426/523 |
| 5,507,220 | A | * | 4/1996 | Jung | 99/403 |
| 5,570,625 | A | | 11/1996 | Liebermann | |
| 5,615,604 | A | | 4/1997 | Chenglin | |
| 5,655,434 | A | | 8/1997 | Liebermann | |
| 5,701,804 | A | | 12/1997 | Liebermann | |
| 6,079,320 | A | * | 6/2000 | Taber et al. | 99/340 |
| 6,196,115 | B1 | * | 3/2001 | Tsao | 99/339 |
| 6,271,504 | B1 | | 8/2001 | Barritt | |
| 2002/0178932 | A1 | * | 12/2002 | Cai | 99/516 |
| 2006/0289451 | A1 | * | 12/2006 | Li | 219/450.1 |
| 2008/0116193 | A1 | * | 5/2008 | Lam | 219/450.1 |

FOREIGN PATENT DOCUMENTS

| CA | 1134892 A1 | 11/1982 |
| DE | 3600294 A1 | 7/1987 |
| WO | 03/086156 A2 | 10/2003 |

* cited by examiner

*Primary Examiner* — Brett Spurlock

(57) ABSTRACT

It is disclosed a household multi-purpose cooking appliance that can function in a barbecue mode, in an oven mode and in a fryer/boiler mode. The appliance comprises a cooking chamber with a top aperture closed by a lid associated to a heating element and an insulating cover. The cooking chamber can contain a lower heating element for use in the oven or fryer cooking mode. A pan is inserted in the cooking chamber in the fryer mode.

15 Claims, 3 Drawing Sheets

MULTI-PURPOSE COOKING APPLIANCE

BACKGROUND OF THE INVENTION

1. Field of the Invention

The present invention relates to a multi-purpose cooking appliance, particularly to a household cooking appliance to be used as oven, barbecue or fryer.

Different cooking methods typically require dedicated appliances. Ovens are suitable to cook food according to many different recipes, but are not suitable to grill food put directly in contact with a broiler, like in an outdoor barbecue. Also, deep-frying food requires a dedicated apparatus provided with an oil tight receptacle or pan equipped with a heating element.

2. Description of the Related Art

DE 36 00 294 A1 discloses a household cooking assembly comprising components to be associated and mounted on each other to form either an oven with a heating element above a cooking chamber, or a deep-frying pot with a heating element at the bottom of the pot. The two functions are achieved by interchanging a heating element fastened to a handle, and by properly assembling certain components to form a suitable cooking space. These operations are relatively complicated and the appliance is not of the ready-to-use type.

U.S. Pat. No. 4,210,072 discloses a portable cooking apparatus to be used as oven or grill, depending on which side of a heated place is in contact with the food to be cooked, one side having a smooth surface for use as oven and the other side having an indented surface for use as grill. In both cases the food is in contact with the heating element.

CA 1 134 892 discloses a portable electric oven comprising a heated base and a heated cover hinged to the base. The cover has a refractory glass window to enable observation of food being cooked or baked.

WO 03/086156 A2 discloses a cooking appliance to deep-fry food articles, which comprises a receptacle with a lower electrical heater body to be immersed in the frying oil and an upper electrical heater body mounted in the lid of the receptacle, to be energized if accelerated heating of oil is desired. In a different embodiment the electrical heater body, instead of being mounted within the lid, is pivotally mounted within the receptacle and has an horizontal operative position and a vertical inoperative position. The appliance is essentially designed for frying or boiling food, not for baking or broiling.

There thus exists a need for a household cooking appliance that enables to perform different cooking methods in one single apparatus of the ready-to-use type, thus allowing to save space and time to users.

SUMMARY OF THE INVENTION

It is therefore an aspect of the present invention to disclose a household cooking appliance capable of combining the function of an oven to that of a barbecue.

It is a further aspect of the present invention to disclose a household cooking appliance capable of combining the function of an oven, of a barbecue and of a fryer or boiler.

It is an additional aspect of the present invention to disclose a multi-purpose cooking appliance having the functions mentioned above, which is also compact and transportable.

The aforesaid and other aspects of the invention, as it will appear from the following description, are achieved by a multi-purpose household cooking appliance comprising a cooking chamber provided with an upper lid associated to at least a heating element, characterized in that the lid comprises an insulated cover movable with respect to the heating element to: a) an open position permitting exposure of the heating element for use as broil; and b) a closed position permitting insulation of the heating element from the external environment, and permitting heating of the cooking chamber defined under the lid in the oven cooking mode.

According to another aspect of the invention, the lid comprises an upper plate and a lower plate, each provided with a heating element, the upper plate being movable with respect to the lower plate to accommodate food articles and permit broiling on both surfaces.

According to a further aspect of the invention, the cooking chamber is associated to a pan and is provided with a lower heating element for use as fryer or boiler.

According to a further aspect of the invention, the lid has a transparent portion to permit observation of the cooking chamber when the lid is closed.

BRIEF DESCRIPTION OF THE DRAWINGS

Some embodiments of the invention will now be described by way of example with reference to the attached drawings, wherein.

DETAILED DESCRIPTION OF THE PREFERRED EMBODIMENTS

Figure 1:
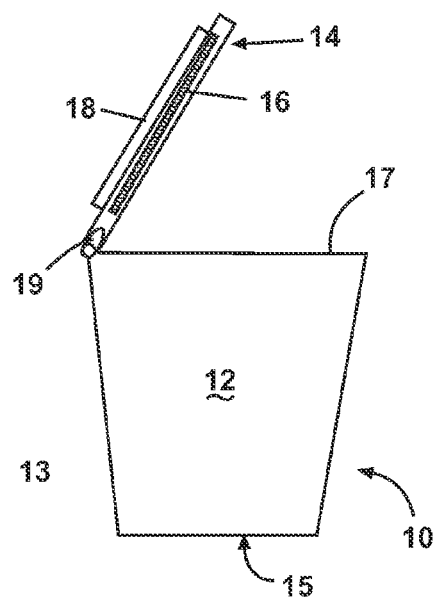
FIG. 1 is a schematic elevational view of a first embodiment of a multi-purpose cooking appliance according to the invention.
Figure 8:
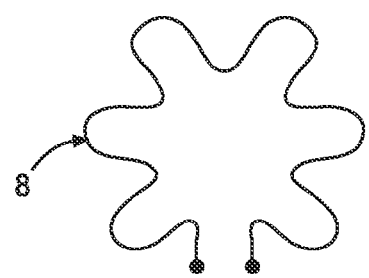
FIGS. 8 and 9 are schematic top views of heating elements of the appliance according to the invention.
Figure 9:
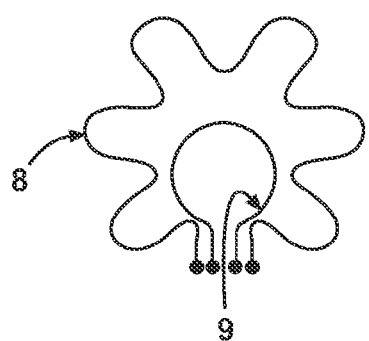

With reference to FIG. 1, a multi-purpose household cooking appliance according to the invention is generally designated with 10. Cooking appliance 10 comprises an oven with a cooking chamber 12 defined by a circular side wall 13 and a bottom wall 15. The oven has a frusto-conical shape and tapers downwards. The cooking chamber is provided with an upper lid 14 with an associated a heating element 16, for example an electric resistance, which in this case is contained in the lid. Examples of electric resistances are shown in FIGS. 8 and 9. FIG. 8 shows a single resistance 8, while FIG. 9 shows two resistances 8 and 9 with different shapes. Lid 14 comprises also an insulated cover 18 ensuring insulation of the heating element 16 from the external environment. In this embodiment lid 14 is movably fastened to the upper edge 17 of the cooking chamber by means of a hinge 19, while cover 18 is detachable from lid 14 to expose its upper surface, when necessary.

Figure 10:
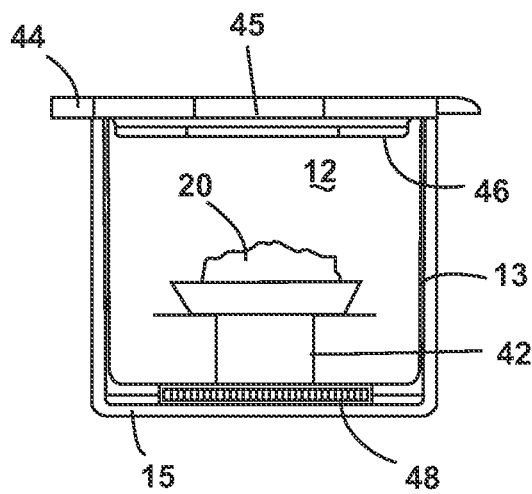
FIG. 10 is a schematic elevational view of part of a sixth embodiment of the appliance according to the invention.

The cooking appliance described above enables to perform two different cooking methods. The first cooking method is that of an oven. In this case lid 14 is first opened to permit the introduction of food articles in cooking chamber 12 and insulating cover 18 is applied onto lid 14, as shown in FIG. 1. Then lid 14 is closed and heating element 16 is energized, so that cooking chamber 12 is heated from the top according to a desired temperature and time program, as is known in the field. Optionally, a lower heating element not shown in FIG. 1 can be provided at the bottom of cooking chamber 12, if a more uniform and/or more powerful heating of the oven is desired. An embodiment of a heating element placed at the bottom of cooking chamber 12 is shown in FIG. 10.

The second cooking method is that of a barbecue. In this case lid 14 is closed but cover 18 is removed thereby permitting exposure of the upper surface of lid 14 which is heated by heating element 16. Lid 14 acts as a broil, and food articles can be put on it to perform a barbecue mode cooking. When heating element 16 is contained in lid 14, a broiler or griddle can be placed on or above the heating element to contain food articles.

Figure 2:
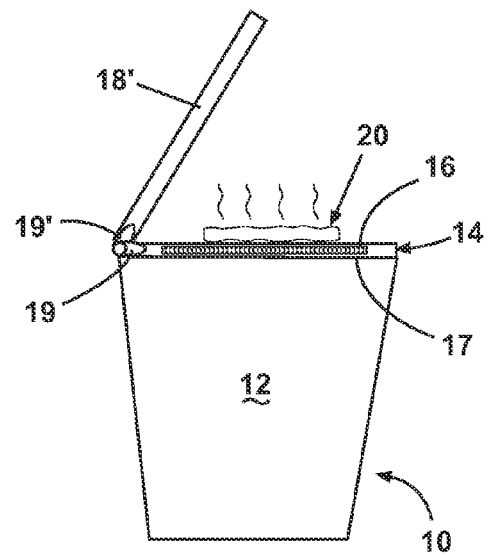
FIG. 2 is a schematic elevational view of a second embodiment of the appliance according to the invention.

According to another embodiment of the invention shown in FIG. 2, cover 18' of lid 14 is fastened to edge 17 of the appliance by means of a hinge 19'. A food article 20 can thus be broiled on lid 14 by simply tilting cover 18' about hinge 19', without detaching it from the appliance.

According to a variant not shown in the attached figures, the heating element 16 including a single resistance 8 or a double resistance 8, 9 can also be independently hinged to the edge of the appliance, so that it can be independently tilted for easy cleaning.

According to another variant not shown in the figures, a broiler or a griddle are placed above lid 14 or heating element 16, and food articles are put on the broiler or griddle.

Figure 3:
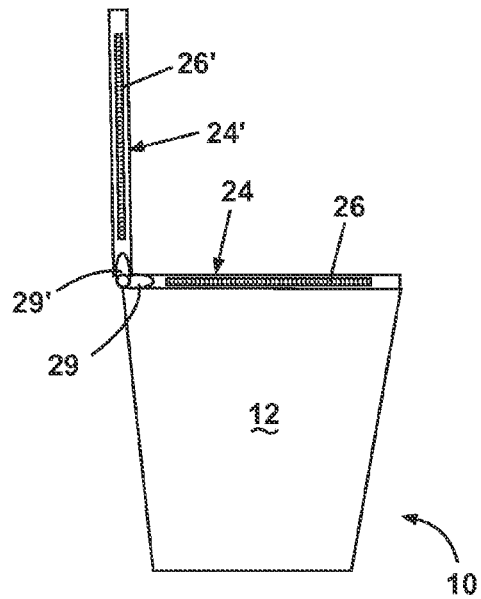
FIG. 3 is a elevational view of a third embodiment of the appliance according to the invention in a first operative position.
Figure 4:
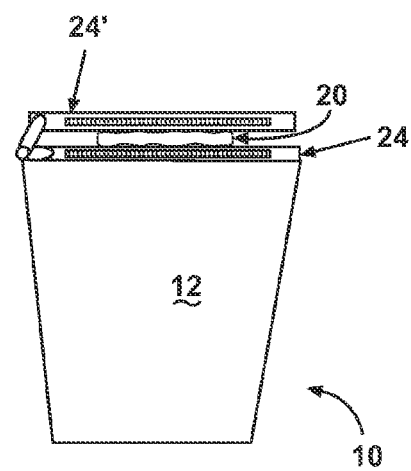
FIG. 4 is a view of the appliance of FIG. 3 in a second operative position.

FIGS. 3 and 4 show a third embodiment of the cooking appliance of the invention, in which the cooking chamber is equipped with a lid consisting of a lower plate 24 and an upper plate 24', tilting independently about hinges 29, 29' and each containing heating elements 26, 26'. When plates 24, 24' are lowered to close the cooking chamber 12, as shown in FIG. 4, a space is defined between lower plate 24 and upper plate 24' to accommodate a food article 20, which can thus be broiled on both sides simultaneously. Of course, although not shown, an insulating cover is associated to upper plate 24' for use when the appliance is used as an oven. The insulating cover can be detachable as in FIG. 1 or hinged as in FIG. 2.

Figure 5:
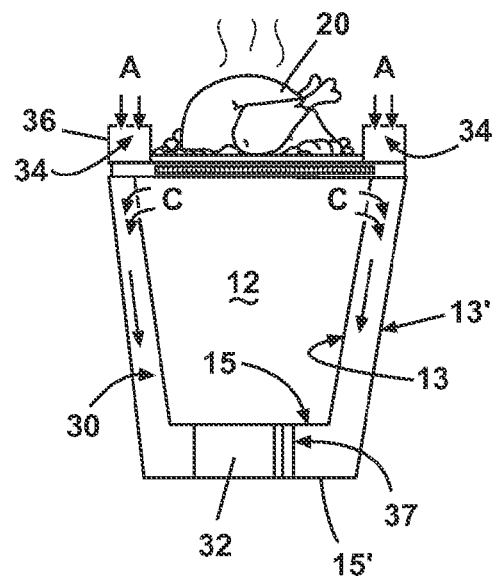
FIG. 5 is a schematic elevational view of a fourth embodiment of the appliance according to the invention in a first operative position.
Figure 6:
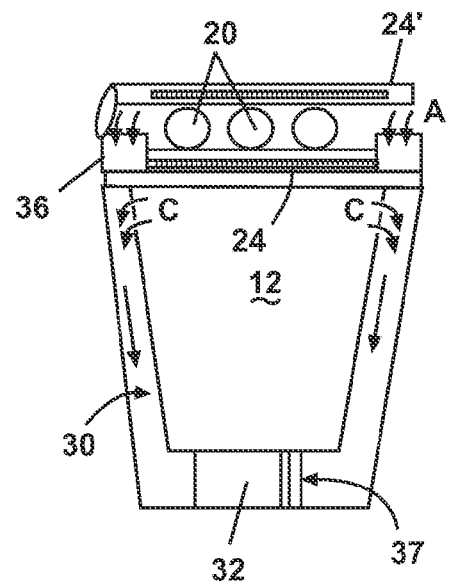
FIG. 6 is a schematic elevational view of the appliance of FIG. 5 in a second operative position.

FIGS. 5 and 6 show a fourth embodiment of the invention, in which the cooking appliance is equipped with a down draft hood to suck exhaust fumes produced by cooking. In this embodiment the oven is provided with double walls 13, 13' and double bottom 15, 15', so that an air space 30 is defined in-between. An engine and fan assembly 32 is positioned in air space 30 between bottoms 15, 15', to suck fumes entering through holes 34 provided at the upper edge of a rib 36 encircling lower plate 24 of the lid of the oven, as shown by arrows A. Exhaust fumes coming from the zone where food articles 20 are broiled can thus be discharged from slots 37 positioned at the back side of the cooking appliance, and conveyed outside the kitchen via a discharge conduit, not shown. The same fumes extraction can be performed when both lower plate 24 and upper plate 24' are used as broiling elements, as shown in FIG. 6. Again, upper plate 24' is insulated toward the external environment for using the appliance as an oven.

Figure 7:
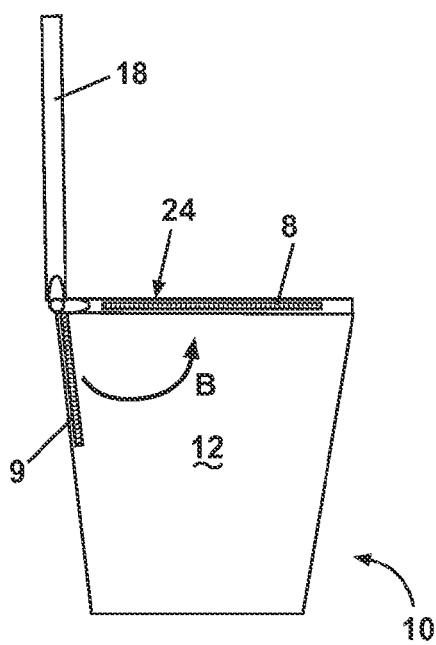
FIG. 7 is a schematic elevational view of a fifth embodiment of the appliance according to the invention.

FIG. 7 shows an embodiment of the invention in which lid 24 is associated to or contains two heating elements, for example a double resistance as illustrated in FIG. 9, with the internal resistance 9 independently hinged to the edge of the appliance. When the appliance is used as a barbecue, cover 18 is raised, lid 24 is lowered to close cooking chamber 12 and both resistances can be operative, namely also the internal resistance 9 is raised as shown by arrow B in a position coplanar with resistance 8 to effect heating of lid 24 for use as broil. When the appliance is used as an oven, cover 18 is lowered to insulate lid 24, which is open to introduce food articles to be baked then lowered to close cooking chamber 12 (acting as an oven door). In this case the internal resistance 9 could be lowered, as shown in FIG. 7 in an operative position almost vertical. Another embodiment of the oven mode the appliance of the invention is shown in FIG. 10. In this embodiment a heating element 46, for example a single or double resistance of the type shown in FIG. 9, is mounted below a lid 44 hinged to the upper edge of circular wall 13 of the cooking chamber. Another heating element 48 is mounted to the bottom 15 of the cooking appliance, below the lower region of the cavity 12.

A support 42 for a dish containing a cooking article 20 is placed in the cooking chamber 12. Support 42 may be part of a basket introduced from the top into the cooking chamber. Lid 44 has a central portion 45 which is transparent, to permit observation of food articles during the cooking process. Transparent portion 45 is for example an insert of ceramic glass. Upper heating element 46 and lower heating element 48 can be energized separately or together, depending on the cooking program selected by the user.

According to a further aspect of the invention, the cooking appliance can function as a fryer or boiler.

Figure 11:
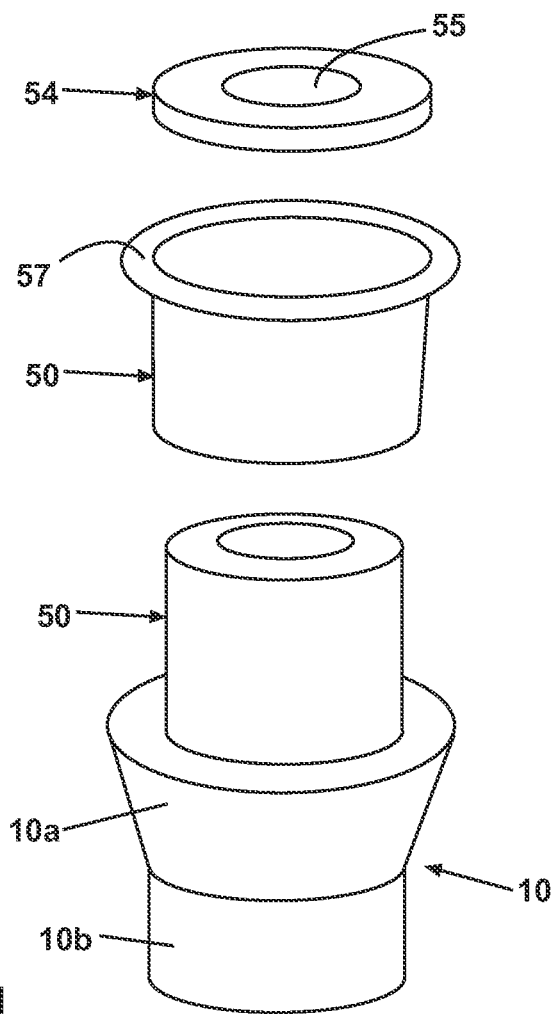
FIG. 11 is a schematic exploded view of a seventh embodiment of the appliance according to the invention.

An embodiment of the cooking appliance suitable for use in the frying mode is shown schematically in FIG. 11. The body of the appliance 10 has an upper frusto-conical part 10a which preferably includes the cooking chamber 12 and a lower cylindrical base part 10b, used for storage and elevating the frusto-conical part 10a to a comfortable height, when the appliance 10 is freestanding. An insulating cylindrical element 52 is housed at least in the upper part 10a of the appliance 10. A heating element (not shown) is positioned in the lower portion of the frusto-conical part 10a just below the cavity 12 and acts as a bake element of the oven. A pan 50 is then housed in the upper frusto-conical part 10a of the appliance with the bottom in contact with or in proximity to the heating element. Pan 50 is also frusto-conical and tapers downward, to allow to use less oil for frying. Pan 50 has an outwardly bent edge 57 suitable to receive a lid 54 provided with a heating element and a cover, as described previously. The resistance placed on the top of the cavity can be protected with a top cover (not shown). The heating element can be of the type tilting from a horizontal position to a vertical position directed downwardly, like resistance 9 shown in FIG. 7. In this embodiment the fryer is thus equipped with a bottom heating element, and, if desired, with an additional heating element 9, when this latter is in the operative position tilted downwards.

When present, the internal resistance 9 when lowered can be used as immersed resistance in the fryer mode.

According to a variant of this embodiment, the cooking appliance in the fryer mode can be provided also with a down draft hood to suck exhaust fumes produced by frying. In this case the structure of the appliance is that of FIGS. 5 and 6, with pan 50 inserted in the cooking chamber 12. The fumes generated by frying are sucked through holes provided in the upper part of internal wall 13, as shown by arrows C. The path of the fumes is the same as that described in connection with FIGS. 5 and 6.

In the frying mode food articles are put in a basket not shown, which in turn is put in pan 50 and immersed in oil to perform a deep-frying cooking method, or simply boiling food articles if the liquid used is water. Also in this case lid 54 can be formed with a transparent central portion, to permit observation of food articles during frying.

The cooking appliance of the invention is thus capable to function according to three different modes, namely oven, barbecue and fryer or boiler, thereby allowing to save space while providing maximum versatility with respect to cooking methods made available to users. Such versatility and availability of different cooking methods contribute to render the cooking process more interesting and enjoyable.

It is clear from the description above that other embodiments of the cooking appliance according to the invention are possible within the same inventive concept. For example, the cooking appliance of the invention can be of a free-standing or built-in type.

Also, it can be provided with wheels to allow transportation within a kitchen or be suitable for outdoor cooking.

I claim:

1. A multipurpose household cooking appliance comprising:
   a cooking chamber adapted to receive food to be cooked, the cooking chamber defined at least in part by a side wall and a bottom wall;
   an upper lid configured to close the cooking chamber, the upper lid including a cooking surface exterior to the cooking chamber adapted to receive food to be cooked, and a heating element for heating the cooking surface;
   an insulated cover movable with respect to the upper lid between an insulating position in which the insulated cover extends along the upper lid to cover the cooking surface of the upper lid, and a non-insulating position in which the cooking surface of the lid is exposed to a user, wherein:
   the cooking appliance is configurable between an oven mode wherein the upper lid closes the cooking chamber and the cooking surface is covered by said insulated cover, and a broil mode wherein the upper lid closes the cooking chamber and the cooking surface is exposed to a user.

2. The household cooking appliance according to claim 1, wherein the upper lid is fastened to the cooking chamber by a hinge.

3. The household cooking appliance according to claim 1, wherein the insulated cover is detachable from the upper lid.

4. The household cooking appliance according to claim 1, wherein the insulated cover is fastened to the upper lid by a hinge.

5. The household cooking appliance according to claim 1, wherein the insulated cover is fastened to the cooking chamber by a hinge.

6. The household cooking appliance according to claim 1, wherein the upper lid comprises an upper plate and a lower plate, each provided with a heating element, the upper plate being movable with respect to the lower plate, wherein the upper lid is configured to accommodate food articles and permit broiling of food articles on both surfaces between the upper and lower plates.

7. The household cooking appliance according to claim 6, wherein the upper and lower plates are fastened to the cooking chamber by hinges.

8. The household cooking appliance according to claim 1, further comprising a down draft hood to suck exhaust fumes produced by cooking downward and out a lower exhaust.

9. The household cooking appliance according to claim 8, wherein the side wall is comprised of double side walls defining an air space in-between and the bottom wall is comprised of double bottom walls defining an air space in-between in communication with the air space of the side wall, the household cooking appliance further comprising:
   at least one air hole configured to channel cooking fumes to the air space of the side wall; and
   a fan assembly operable to discharge such the cooking fumes outwardly of the household cooking appliance.

10. The household cooking appliance according to claim 9, wherein the at least one air hole is provided at an upper edge of a rib encircling the upper lid.

11. The household cooking appliance according to claim 1, wherein the upper lid comprises two heating elements independently hinged to an upper edge of the cooking chamber, whereby at least one of the heating elements is movable from a substantially vertical operative position to a substantially non-vertical operative position within the cooking chamber.

12. The household cooking appliance according to claim 1, further comprising:
   a heating element within the cooking chamber; and
   a pan movably housed in the cooking chamber, the pan being liquid tight to contain oil to fry food articles.

13. The household cooking appliance according to claim 12, wherein the pan is of a frusto-conical shape and tapers downward.

14. The household cooking appliance according to claim 9, wherein the at least one air hole is provided at an upper portion of the cooking chamber to suck fumes produced by frying downward.

15. The household cooking appliance according to claim 1, further comprising a heating element provided at a bottom of the cooking chamber.

* * * * *